United States Patent [19]

Panush

[11] 4,017,448

[45] Apr. 12, 1977

[54] TRANSPARENT PIGMENT DISPERSION PROCESS

[75] Inventor: Sol Panush, Farmington Hills, Mich.

[73] Assignee: Celanese Coatings & Specialties Company, Louisville, Ky.

[22] Filed: June 16, 1975

[21] Appl. No.: 587,192

[52] U.S. Cl. .................... 260/31.4 R; 260/31.2 R; 260/31.2 N; 260/32.8 R; 260/32.8 N; 260/33.2 R; 260/33.4 R; 260/33.6 UA; 260/39 P; 260/39 M; 260/42.21; 260/42.22

[51] Int. Cl.$^2$ .................... C08K 5/02; C08K 5/05; C08K 5/07; C08K 5/10

[58] Field of Search ........ 260/34.2, 31.2 R, 31.4 R, 260/42.54, 42.22, 42.21, 33.4 R, 39 P, 39 M, 32.8 R, 33.6 UA; 106/193 J, 193 D

[56] References Cited

UNITED STATES PATENTS

| | | | |
|---|---|---|---|
| 2,335,760 | 11/1943 | Hucks | 106/193 J |
| 2,384,579 | 9/1945 | Vesce | 260/22 |
| 2,934,512 | 4/1960 | Godshalk | 260/42.22 |
| 2,941,894 | 6/1960 | McAdow | 106/193 J |
| 3,773,710 | 11/1973 | Victorius | 260/42.22 |
| 3,862,071 | 1/1975 | Di Carlo | 260/42.22 |
| R23,757 | 12/1953 | Pike | 260/16 |

OTHER PUBLICATIONS

*Journal of the Oil and Colour Chemist's Association*, vol. 47, 1964, pp. 719–736.

*Primary Examiner*—Allan Lieberman
*Attorney, Agent, or Firm*—Herbert P. Price; K. A. Genoni; T. J. Morgan

[57] ABSTRACT

Transparent pigment dispersions, having long term storage capabilities and which produce coatings having a rich clean color and excellent transparency are produced by first dispersing the pigment in a resin solution under high speed, high shear, high impact conditions followed by completing the dispersion under conditions of maximized shear and minimized impact. Such pigment dispersions are useful in automotive paints, particularly "metallic" automotive paints.

9 Claims, No Drawings

TRANSPARENT PIGMENT DISPERSION PROCESS

BACKGROUND OF THE INVENTION

The field of art to which this invention pertains is pigment dispersions particularly dispersions of transparent pigments.

Transparent pigments have been utilized in "metallic" automotive coatings for quite a number of years. The preparation of such coatings using transparent red oxide pigments is described in U.S. Pat. Nos. 2,335,760, 2,384,579 and Re. 23,757. The so-called transparent pigments have extremely small particle sizes which exist in agglomerated form, the less the agglomeration the more the transparency. U.S. Pat. No. Re. 23,757 describes a process of "flushing" pigments from the wet pulp stage directly into lacquers without the intermediate step of drying and pulverizing the pigment. When properly conducted, the very small primary particles of the pigment do not agglomerate to any great extent and do not change markedly from their freshly precipitated condition. However, this "flushing" procedure has disadvantages. The pigments must be used in a freshly precipitated condition which requires the pigment manufacturing facilities to be in close proximity to the paint making facilities. Shipping costs are high since water must be shipped with the pigments. After the dispersion of pigment in the paint has been made, the water must be removed from the paint.

When the precipitated pigments are dried before use, they form agglomerates which are extremely difficult to break up. Simply grinding and pulverizing the pigments do not work. Some success has been obtained in dispersing the pigments in resin solutions using various dispersion means, e.g., roll mills, steel ball mills, sand grinders, high speed dispersers and the like. However, completely satisfactory pigment dispersions having long term stability and which product coatings having a bright face, clean color and excellent transparency have not been obtained by these methods.

SUMMARY OF THE INVENTION

This invention pertains to a pigment dispersion process. In particular this invention relates to a process for dispersing transparent pigments. More particularly this invention pertains to a process for preparing pigment dispersions useful in metallic automotive coatings.

In carrying out the process of this invention, pigments are dispersed in an acrylic resin solution under conditions of high speed, high shear and high impact so that the temperature rises from room temperature to about 200° to 240° F. over a period of at least 3 hours and the viscosity increases due to volatilization of solvent. The shear stress, which is dependent upon viscosity, increases from about 300 to 600 gm./cm. sec.$^2$ up to about 5,000 to 6,000 gm./cm. sec.$^2$. The flow of the dispersion during the process changes from turbulent to laminar flow as measured by the Reynolds Number change of about 25,000 to about 30,000 down to about 1,500 to about 2,500. Following the high speed, high shear, high impact stage, dispersing action under conditions of maximized shear and minimized impact is continued for a period of 12 to 25 hours to complete the dispersion of pigment particles to a particle size of 8 as measured on a Hegman grind guage scale at maximum temperature of about 140° F.

When processed under these conditions, pigment dispersions are obtained which exhibit excellent stability over extended periods of time with excellent retention of rheological and color qualities. Coatings made from such dispersions exhibit rich clean face with excellent transparency.

DESCRIPTION OF THE INVENTION

Pigments useful in this invention are those capable of forming transparent dispersions. Examples of such pigments are iron or ferric oxide, e.g., transparent red oxide and transparent yellow oxide, as well as phthalocyanine green, phthalocyanine blue, anthrapyrimidine yellow, flavanthrone yellow, imidizole orange, quinacridone orange, perylene red, quinacridone red, carbazole blue, dioxazine blue, indanthrene blue, azo browns, isoindolinones, high molecular weight azo pigments, and the like.

In carrying out the process of this invention, the pigments are dispersed in acrylic resin solutions. Such acrylic resins are film-forming acrylic copolymers made by polymerizing acrylic monomers with a free radical producing catalyst. Suitable acrylic copolymers are the thermosetting hydroxy-carboxy copolymers described in U.S. Pat. No. Re. 27,151. These hydroxy-carboxy copolymers are copolymers of a polymerizable monoethylenically unsaturated acid, a hydroxyalkyl ester of a polymerizable monoethylenically unsaturated acid and at least one monoethylenically unsaturated monomer copolymerizable therewith. These copolymers contain about 0.15 to about 5 weight percent acid and about 5 to about 50 weight percent hydroxyalkyl ester with the remainder being a monomer copolymerizable therewith, the total equals 100 weight percent.

Suitable polymerizable acids include acrylic acid, methacrylic acid, itaconic acid, crotonic acid and half esters of maleic and fumaric acid formed by esterifying one acid group of maleic or fumaric acid with a saturated alcohol containing one to 10 carbon atoms.

The hydroxyalkyl esters of polymerizable acids include the hydroxyalkyl esters of the polymerizable acids described above. The preferred hydroxyalkyl esters are the beta-hydroxyalkyl esters which contain 2 to 4 carbon atoms in the alkyl group. Examples of suitable esters are beta-hydroxyethyl acrylate, beta-hydroxyethyl methacrylate, beta-hydroxypropyl acrylate, beta-hydroxypropyl methacrylate, gamma-hydroxypropyl acrylate, beta-hydroxybutyl crotonate, beta-hydroxypropyl butyl maleate, beta-hydroxypropyl ethyl fumarate, beta-hydroxyethyl acid maleate and di(beta-hydroxypropyl) fumarate.

The other monomers that are copolymerized with the acid and hydroxy monomers are any copolymerizable monomer containing one polymerizable ethylenically unsaturated group and being devoid of hydroxy groups and carboxy groups. Such monomers include esters of acrylic and methacrylic acids with alkanols containing 1 to 12 carbon atoms, such as ethyl acrylate, methyl methacrylate, butyl acrylate, butyl methacrylate, 2-ethylhexyl acrylate, lauryl methacrylate, benzyl acrylate, cyclohexyl methacrylate and the like. Additional monomers include acrylonitrile, methacrylonitrile, styrene, vinyl toluene and methyl ethacrylate.

The acrylic resins most preferably used in the process of this invention are those which have an acid value of about 15 to about 20 and are free of copolymerized methyl methacrylate monomer.

Solvents used in the process of this invention are aromatic hydrocarbons and oxygenated solvents (alcohols, esters, ketones, ether alcohols and ether alcohol esters) having boiling points above about 240° F. Examples of such solvents are xylene, n-butanol, ethylene glycol ethyl ether acetate, cyclohexanol, hexanol, butyl acetate, ethylene glycol monobutyl ether acetate, 2-ethylhexyl acetate, cyclohexanone, propylene glycol methyl ether as well as commercial mixtures of aromatic mixed hydrocarbons. Preferred organic solvents are those having boiling points between about 240° and 320° F. A particularly preferred organic solvent is ethylene glycol ethyl ether acetate.

In carrying out the process of this invention, the acrylic resin solution, additional solvents if necessary and pigments are, in the first stage, charged into a high speed disperser and are dispersed for a period of at least three hours until the temperature, due only to the energy imput by the disperser and not to any outside heat source, rises to 200° to 240° F. Any high speed dispersing equipment, such as that described in the Journal of the Oil and Colour Chemists' Association, Vol. 47, pages 719–727 (1964), can be used provided sufficient energy is imparted to the dispersion to raise the temperature to the required temperature in the required time. Preferred mixers have variable speed controls, so that this time-temperature relationship can be obtained. A particularly preferred disperser is a Myers High Speed Disperser manufactured by Myers Engineering Company of Bell, Calif. This disperser is a dual shaft disperser having two flat, saw-tooth type, disc blades on each shaft. The shafts rotate in the same direction at a variable speed of 200 to 1600 rpm and 700 to 6000 pfm range.

When the first stage is completed, a finished dispersion is obtained under conditions of maximized shear and minimized impact wherein the energy input is applied at such a rate that the temperature increase does not exceed about 140° F. Such dispersing action can be accomplished by conventional mills, such as steel ball mills, pebble mills, 2 and 3 roll mills, and sand grinders. However, for maximum transparency and maximum cleanness and clarity, it is preferred to use a Szegvari Attritor. The Szegvari Attritor is described in detail in the Journal of the Oil and Colour Chemists' Association, Vol. 47, pages 728–736 (1964), which is herein incorporated by reference. The dispersion reaction in the final stage is continued at a temperature range of 90° to 140° F. for 15 to 25 hours.

In the first stage of the process, the pigment and resin are charged to the disperser in a ratio of pigment to resin of about 2.5:1 to about 3.5:1 and preferably about 2.9:1 to about 3.1:1. Sufficient solvent in added to give a workable mixture, this amount of solvent being sufficient to give a non-volatiles content of about 55 to about 65% by weight. After the first stage dispersion is completed, additional solvent or solvent and resin can be added to improve the handling properties of the pigment dispersion. The second stage of the process is then conducted with or without the addition of solvent or solvent and resin.

Referring to the first stage of the process, it has been found that the temperature and time under which this stage is conducted are critical. The dispersion must be carried out for a minimum of 3 hours and the temperature must reach the 200° to 240° F. range within this period. If the dispersion reaction is conducted for a period less than 3 hours or if a temperature of 200° F. is not reached, satisfactory color development is not obtained. If the 200°–240° F. temperature range is reached before the end of the 3 hour period, then agitation must be decreased so that the 240° F. is not exceeded, but agitation must be continued until a total time of at least 3 hours is obtained. If the temperature range is not reached in 3 hours, then agitation can be continued until the temperature is reached. However, the total dispersing time for the first stage should not exceed about 5 hours. The temperature of 240° F. must not be exceeded. If exceeded, crystallization of the pigment occurs.

During the first stage of the dispersion reaction, solvents are lost due to vaporization, since the vapor pressure of the solvents approaches atmospheric pressure at the dispersion temperature of 200°–240° F. These solvents can be vented to the atmosphere or they can be recovered. However, they must not be reintroduced into the dispersion while the first stage is in process. This loss of solvent contributes to an increase in viscosity of the system which corresponding changes in Reynolds Number and shear stress. The weight loss of the total pigment dispersion, due to loss of solvent, is about 5 to about 12 weight percent based on the initial batch (pigment, resin and solvent) weight. The weight percentage of solvent actually lost will be about 15 to about 25 weight percent based upon the weight of solvent present in the batch at the beginning of the first stage dispersion versus the weight of solvent in the batch at the end of the first stage dispersion before additional solvent and resin are added.

Reynolds Number, a dimensionless number, is an engineering term which is used to define flow. A high Reynolds Number indicates turbulent flow, a low number indicates laminar flow. The Reynolds Number for a single-blade disperser is a cylindrical tank has been defined as:

$$N_{Re} = \frac{\rho v \chi}{\eta}$$

where
$\rho$ = density of the material in gm./cm.$^3$
$v$ = velocity (perepheral) in cm./sec.
$\chi$ = distance of blade off tank bottom in cm.
$\eta$ = viscosity in poises (dyne-sec./cm.$^2$)

Reynolds Numbers for the first stage of the dispersion process, based upon this formula, have been found to vary from about 25,000 to about 30,000 when dispersing is begun down to about 1,500 to about 2,500 when the first stage is completed.

Shear rate has been defined as the shear at the blade surface at a given angular velocity.

$$\text{shear rate} \alpha = v/\chi = s\pi d/\chi$$

where
$s$ = shaft speed
$d$ = blade diameter (cm.)
$\chi$ = distance of blade off bottom of tank in cm.

Shear stress is the product of shear rate and viscosity.

$$\text{shear stress} = \tau = \eta \, \alpha$$

It has been determined that the shear stress for the first stage of the process of the invention will vary from about 300 to about 600 gm./cm. sec.$^2$ at the beginning up to about 5,000 to 6,000 gm./cm. sec.$^2$ at the end of the first stage dispersion process.

The color of the dispersion at the end of the first stage has developed to its truest, deepest value, e.g., dispersion of transparent red oxide is a rich, deep chocolate brown. Before being removed from the dispersion tank, additional solvent or acrylic resin and solvent can be added to reduce the viscosity and to facilitate handling for conducting the second stage.

The conditions under which the second stage reaction is conducted are not quite as critical as those for the first stage. The time required is that length of time which is sufficient to obtain maximum color development and transparency, generally about 12 to about 25 hours. The temperature during the dispersion reaction will range from about 90° to about 140° F. It is preferred that a temperature of about 140° F. not be exceeded, and most preferably the temperature range is about 100° F. to about 130° F. Generally, the pigment to binder ratio during this second stage ranges from about 0.5 to about 1 and preferably about 0.7 to about 0.9. The solids content will vary from about 50 to about 65% by weight. The second stage dispersion reaction is conducted until the minimum particle size, i.e., the minimum amount of aggregated particles are obtained. The completeness of the dispersion of pigment particles is determined by making a thermosetting acrylic paint from the pigment dispersion by well known techniques using pigment and aluminum flakes in the weight ratio of 80/20, spraying the paint on a steel panel, baking it and determining the degree of color development and transparency which is obtained. As a control for the operator, prior to making the panel spray-out, the fineness of the grind is determined using a grind guage. Dispersing is continued until a grind guage reading of 8 on a Hegman scale (also referred to as North Standard (NS)scale) is obtained.

The pigment pastes obtained by the process of this invention are used in combination with metallic pigments, e.g., aluminum flake pigments, to make "metallic" or polychromatic paints used by the automotive industry, such as those described in "Organic Coating Technology," Volume II, by H. F. Payne, pages 1188–1189 (1961). U.S. Pat. Nos. Re. 27,151, 3,438,800, 3,446,769 and 3,639,147 describe paint systems in which the pigment dispersions obtained by the process of this invention can be used.

The following examples will explain the invention in more detail. Parts and percentages where used are parts and percentages by weight unless otherwise designated.

EXAMPLE 1

To a mixing tank were added 25.76 parts of ethylene glycol monoethyl ether acetate, 42.5 parts of transparent red oxide pigment and 25.34 parts of an acrylic resin solution. This resin solution had been made from a copolymer of 27.18% styrene, 29.0% n-butyl methacrylate, 21.06% 2-ethyl hexyl acrylate, 1.79% acrylic acid and 20.97% hydroxypropyl methacrylate, dissolved in xylene at 55% solids, having a Gardner-Holdt viscosity at 25° C. of U and an acid value, based on solids, of 20. The mixture of resin pigment and solvent was dispersed with a Myers 550 Series Dual Range Disperser at 1400–1600 r.p.m. for 3 hours with the temperature rising to 210° F. during this 3-hour period. Additional solvent, 1.22 parts, and acrylic resin solution, 5.18 parts, were added and thoroughly mixed with the pigment dispersion. The dispersion at this stage had a solids content of 65% (46.6% pigment and 18.4% resin), and was a rich deep chocolate brown in color.

The first stage pigment dispersion, 41.18 parts, was added to an attritor, Union Process S-200 Attritor, along with 30.54 parts of the acrylic resin solution and 2.77 parts of ethylene glycol monoethyl ether acetate. The mixture was then dispersed in the attritor for 16 hours with the temperature rising to 120° F. during this period. At the end of this period, the fineness of the grind was 8 on the Hegman scale (N.S. scale). Additional solvent, 8.28 parts of ethylene glycol monoethyl ether acetate, and acrylic resin solution, 17.23 parts, were added to the attritor, the mixture was dispersed for an additional three hours, and was then drained into a suitable container.

This red oxide pigment dispersion paste, 48 parts, was blended with 4 parts of an aluminum pigment paste containing 20% non-leafing aluminum, 31.7 parts of the acrylic resin solution described above, 21.5 parts of butylated melamine-formaldehyde resin at 65% solids in 50/50 xylene-butanol, and 27 parts of xylene. Blending was continued until a smooth enamel was obtained. This enamel was then sprayed on primed steel panels and the panels were baked at 250° F. for 30 minutes. The coatings on the panels were well cured and exhibited excellent bright color with a high degree of transparency.

EXAMPLE 2

To a mixing tank were added 28.81 parts of ethylene glycol monoethyl ether acetate, 0.85 part of a 70% solids nonionic surfactant, 42.5 parts of transparent red oxide pigment and 21.44 parts of an acrylic resin solution. This resin solution had been made from 36.75 parts styrene, 39.35 parts butyl acrylate, 22 parts hydroxypropyl methacrylate and 1.9 parts of methacrylic acid, dissolved at 65% solids in a blend of 12% n-butanol and 88% ethylene glycol monoethyl ether acetate. The resin solution had a Gardner-Holdt viscosity at 25° C. of $Z_2$ and an acid value, based on solids, of 17. This mixture of resin, pigment, solvent and surfactant was dispersed with a Myers 550 Series Dual Range Disperser at 1400–1600 r.p.m. for 3 hours with the temperature rising to 210° F. during this period. Additional solvent, 2.02 parts of ethylene glycol monoethyl ether acetate, and resin solution, 4.38 parts, were added and thoroughly mixed with the pigment dispersion. The dispersion at this stage had a solids content of 65%, and was a rich deep chocolate brown in color.

The first stage pigment dispersion, 41.18 parts, was added to an attritor, Union Process S-200 Attritor, along with 25.85 parts of the acrylic resin solution described above, 0.75 part of xylene, 5.03 part of n-butanol and 1.68 parts of V.M.& P. naphtha. The mixture was dispersed in the attritor for 16 hours with the temperature rising to 125° F. during this period. The particle size of the pigments measured 8 on the Hegman scale (N.S. scale). Additional resin solution, 17.83 parts, as well as 0.83 part of xylene, 5.59 parts of n-butanol and 1.86 parts of V.M.& P. naphtha were added to the attritor. Dispersing was continued for an additional 3 hours, after which time the dispersion was drained into a suitable container. The pigment dispersion had a solids content of 54.7% and a pigment to binder ratio of 0.535.

This pigment dispersion, 48 parts, was blended with 4 parts of an aluminum pigment paste containing 20% non-leafing aluminum, 31.7 parts of the acrylic resin solution described above, 21.5 parts of a butylated melamine-formaldehyde resin at 65% solids in 50/50 butanol-xylene, and 27 parts of xylene. Blending was continued until a smooth enamel was obtained. This enamel was sprayed on primed steel panels and the panels were baked at 250° F. for 30 minutes. The coatings on the panels were well cured and exhibited excellent bright color with a high degree of transparency.

It is to be understood that the foregoing detailed description is given merely by way of illustration and that many variations may be made therein without departing from the spirit of the invention,

What is claimed is:

1. A process for preparing a transparent pigment dispersion which comprises
   A. in a first stage, dispersing a pigment selected from at least one member of the group consisting of iron oxide, phthalocyanine green, phthalocyanine blue, anthrapyrimidine yellow, flavanthrone yellow, imidazole orange, quinacridone red, carbozole blue, dioxazine blue, indanthrene blue, azo browns, isoindolinones and high molecular weight azo pigments in an acrylic resin solution, wherein the acrylic resin is a film-forming acrylic copolymer made by polymerizing acrylic monomers with a free radical producing catalyst, in a pigment to resin ratio of about 2.5:1 to about 3.5:1 and at a solids content of about 55 to about 65 weight percent using as solvents aromatic hydrocarbons and oxygenated solvents having boiling points above 240° F., under high speed, high shear, high impact conditions so that the temperature rises from room temperature to 200° to 240° F. over a period of at least 3 hours, the shear stress increases from about 300 to 600 gm./cm.sec.$^2$ to about 5,000 to 6,000 gm./cm.sec.$^2$, the flow of the dispersion changes from turbulent to laminar flow as measured by a Reynolds Number change of about 25,000 to about 30,000 down to about 1,500 to about 2,500; and
   B. in a second stage at a pigment to resin ratio of about 0.5 to about 1 at a solids content of about 50 to about 65 weight percent, completing the dispersion of pigment to a fineness of 8 as measured on a Hegman scale under conditions of maximized shear and minimized impact for a period of about 12 to about 25 hours at a temperature of about 90° to about 140° F.

2. The process of claim 1 wherein the acrylic resin is a hydroxy-carboxy copolymer containing about 0.15 to 5 weight percent copolymerized monoethylenically unsaturated acid, about 5 to about 50 weight percent copolymerized hydroxyalkyl ester of a polymerizable monoethylenically unsaturated acid, with the remainder being a monomer copolymerizable therewith.

3. The process of claim 2 wherein the acrylic resin has an acid value of about 15 to about 20.

4. The process of claim 3 wherein the acrylic resin is free of copolymerized methyl methacrylate monomer.

5. The process of claim 1 wherein the iron oxide pigment is a transparent red oxide or a transparent yellow oxide.

6. The process of claim 1 wherein the first stage reaction is conducted for 3 to 5 hours.

7. The process of claim 1 wherein the pigment to resin ratio in the first stage is 2.9:1 to 3.1:1.

8. The process of claim 1 wherein the weight loss in the first stage is about 5 to about 12 weight percent based on the total initial weight.

9. The process of claim 1 wherein the pigment to resin ratio in the second stage is about 0.7 to about 0.9.

* * * * *